UNITED STATES PATENT OFFICE 2,661,136

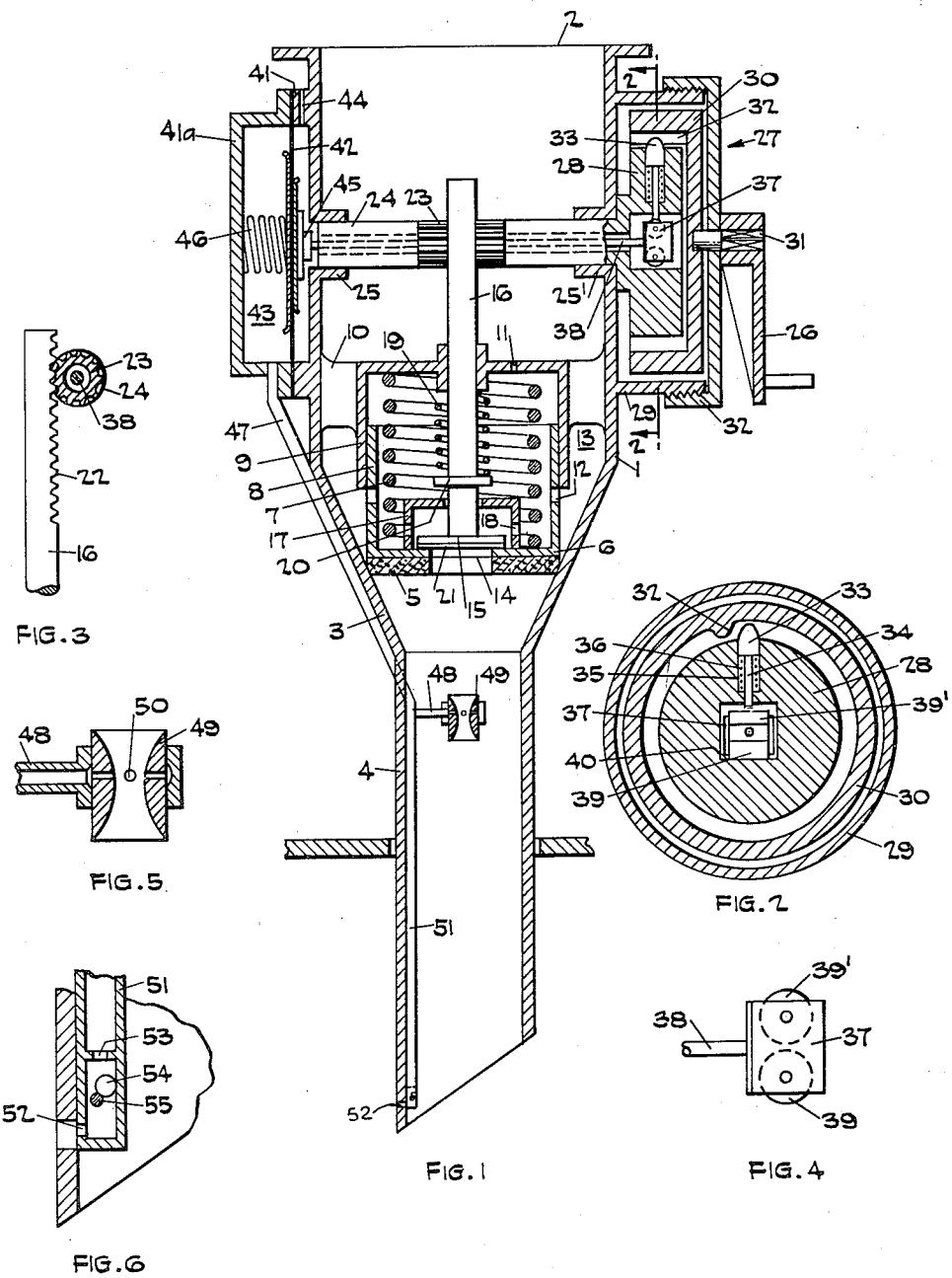

AUTOMATIC SHUTOFF LIQUID DISPENSING NOZZLE

Albert Jacob Huisman, The Hague, Netherlands, assignor to Shell Development Company, San Francisco, Calif., a corporation of Delaware Application November 8, 1950, Serial No. 194,641

Claims priority, application Netherlands November 15, 1949

13 Claims. (Cl. 226—127)

This invention relates to improvements in automatic shut-off nozzles for delivering liquid into a tank, e. g., a nozzle attached to the end of a flexible hose for feeding liquid fuel into the fuel tank of an aeroplane. Such nozzles are provided with valves which are opened at the will of the operator, e. g., manually, and have mechanism that automatically shuts the valve when the liquid in the tank has risen to a certain level, the level being usually fixed with relation to the nozzle.

The invention is particularly, although not exclusively, concerned with shut-off devices that are vacuum-actuated. In such devices the liquid is flowed through a vacuum-generating element, such as a Venturi constriction, and the partial vacuum generated by the flow of liquid is transmitted through a conduit to a vacuum chamber having a movable, vacuum-responsive element such as a bellows or diaphragm that is connected to a mechanism for closing the valve upon a rise in vacuum. Gas, e. g., atmospheric air, is normally admitted to the vacuum system through a vent that has an opening at the level to which it is desired to fill the tank at the moment of automatic closing of the valve. When the liquid level is below the opening the entry of gas through the vent breaks the vacuum and the mechanism is not operative; when the liquid rises to the opening the admission of gas is prevented, thereby causing the vacuum to rise and move the vacuum-responsive element for closing the valve.

In the practical use of such dispensing nozzles, particularly when high delivery rates are used, the powerful jet of liquid creates so much agitation and foam in the tank that some liquid rises to above the predetermined level, viz., the level of the vent opening, before the tank has received the volume of liquid required to fill the tank when the liquid is quiescent; this results in too early a closing of the valve, and makes it necessary for the operator to dispense an additional quantity of liquid by manual operation of the valve, usually at a lesser rate.

It is a primary object of the invention to provide an improved dispensing nozzle of the type indicated that is provided with two valves, e. g., a main valve controlling and a smaller auxiliary valve for passing a relatively smaller amount of liquid even when the main valve is seated, the valves being selectively operable to permit a tank to be first filled at a high rate through the main valve and thereafter at a lower rate through the auxiliary valve, wherein both of the valves are automatically controlled to shut off the delivery at a predetermined liquid level.

Further objects are to provide a vacuum-actuated, automatic shut-off dispensing nozzle having independently manually operable valves wherein the vacuum-generating element is disposed to receive liquid that is passed by either valve, both valves being served by the vacuum-responsive automatic shut-off mechanism so that the latter is effective for closing whatever valve happens to be open at the instant that the liquid level in the tank reaches the predetermined level; and to arrange the vacuum-generating element so as to obviate the need for baffles, flow resistance devices or the like beyond the valves to insure passage of at least some liquid through the said element.

Still other objects are to provide an improved mechanism for actuating the valve of an automatic shut-off dispensing nozzle wherein the valve or valves may be opened or lifted from their seats to any desired extent under manual control and which is effective for closing the valve or valves from any position thereof; to provide an improved clutch arrangement or release device for disconnecting the valve or valves from the manually operable member to permit the closing thereof when the vacuum-responsive mechanism is actuated; and to improve the vent system whereby the admission of gas or atmospheric air may be rapidly stopped and the drawing in of liquid into the vacuum chamber is avoided or reduced.

Still other objects of the invention will become apparent from the following specification and claims.

Dispensing nozzles with automatic shut-off mechanisms having a pair of valves controlling alternate passages are already known; however, in such nozzles the smaller valve served only to relieve the pressure acting on the main valve to facilitate the operation thereof. A nozzle of this kind is disclosed in U. S. Patent No. 2,420,341 (see Figs. 6, 7 and 8); wherein the smaller valve serves exclusively as a relief valve for the main valve and, when the main valve is shut off, the former cannot be used to feed liquid at lower delivery rates in the same manner as can be done with the main valve.

According to the instant invention the dispensing nozzle is provided with a plurality of valves for controlling separate liquid streams and the automatic shut-off mechanism is arranged to operate when liquid is passed by either valve; in the specific embodiment to be described, wherein both valves control the flow of the same liquid and one valve is smaller than the other, the smaller valve may retain the function of acting as a pressure relief valve, although this is not essential in the broadest aspect of the invention. According to a preferred embodiment, using a vacuum-actuated mechanism, the element for creating a partial vacuum (for instance, a Venturi tube or a Pitot tube) is so located that it operates both as a result of the flow of liquid which is admitted via the auxiliary or relief valve and of the flow of liquid which is admitted through the main valve, so that by means of the partial vacuum created by the flow of liquid an automatic closure can be obtained for the auxiliary or smaller valve as well as for the main valve. In the construction according to the said U. S. patent the Venturi tube for creating a partial vacuum is so located that when the relief valve only is opened the liquid does not flow through the Venturi tube.

According to a particularly useful construction of the nozzle according to the invention, the auxiliary or smaller valve can form the central part of the main valve, while the element for creating a partial vacuum lies in the extension of the center line of the main valve. It thereby becomes unnecessary to provide baffles or similar parts for creating flow resistance, downstream from the valves in order to constrain the liquid or a part of it to flow through the vacuum-generating element; this permits greater delivery speeds for given supply pressures.

Furthermore, in order to use the smaller valve as a delivery valve it is necessary that the valve actuating means for lifting the valves be constructed in such a way that the smaller valve can be lifted independently of the main valve, and that the releasable connection between the manually operated member and the valve actuating means (which also retains the smaller valve in open position) be automatically releasable at any position of the smaller valve away from the closed position thereof or, stated otherwise, in any position of the manually operated member. This is impossible with the construction according to the U. S. Patent No. 2,420,341. According the the instant invention this desired operation is made possible by providing a lost-motion connection between the auxiliary and main valves (i. e., permitting the auxiliary valve to engage the main valve with some backlash) and connecting the valve actuating means directly to the stem of the auxiliary valve for lifting both valves against a spring pressure and against the liquid pressure; the releasable connection is then arranged so that it can be released at each lifting level of the auxiliary valve, whether or not the main valve is unseated thereby. This enables the smaller valve to receive the necessary lift whilst, independent of this, the valve or valves are shut as soon as the liquid level has risen to the desired height.

The invention will be further described by reference to an illustrative embodiment shown in the drawings forming a part of this specification, wherein:

Fig. 1 is a longitudinal sectional view; Fig. 2 is an enlarged sectional view taken on line 2—2 of Figure 1; and Figures 3, 4, 5 and 6 are enlarged detail views of various parts of the mechanism.

Referring to the drawing in detail, the dispensing nozzle comprises a casing 1 having an inlet 2 which may be attached, for example, to a flexible supply hose for gasoline and merges via a conical part 3 into a spout or nozzle proper indicated at 4, which is adapted to be inserted vertically through an opening into the tank to be filled. The conical part 3 serves as a seat for the yieldable or elastic sealing material 5 of a main valve 6 which is resiliently urged downwardly to closed position by a coiled compression spring 7. The valve has an integral cylindrical upwardly extending wall 8 which has a sliding fit within a stationary cylinder 9 attached to the casing by radial arms 10. These arms are circumferentially spaced to provide relatively large intervening spaces for the passage of liquid. The cylinder 9 serves as a guide for the main valve and also serves as a dash pot or buffer cylinder, being provided with one or more restricted orifices 11 in its rear wall; this prevents unduly rapid movement of the valve 6 and consequent shocks in the nozzle when the valve is moved to closed position. This dash-pot or chamber communicates with the liquid supply chamber surrounding the cylinders via one or more wider openings 12 in the wall 8 which are located just below the edge of the stationary cylinder 9 when the valve is closed and are covered thereby during the early part of the opening movement of the valve. The annular space 13 surrounding the stationary cylinder 9 and the main valve constitutes the main passageway for the flow of liquid from the inlet to the spout.

The valve 6 has a central opening 14 which forms an auxiliary passageway for liquid which is supplied thereto via the ports 12. This opening is controlled by an axially reciprocably auxiliary or relief valve 15 having a valve stem 16 extending through and guidingly supported in the rear wall of the cylinder 9 and further guided in a cap 17 which is fixed to the upper face of the valve 6 and is provided with large perforations 18 for the passage of liquid. A coiled compression spring 19, acting between the rear wall of cylinder 9 and a collar 20 on the valve stem, yieldingly urges the auxiliary valve downwardly to closed position. A layer of yieldable material 21 may be fixed to the bottom of valve 15 to improve the sealing thereof.

The means for selectively opening the above-described valves comprises a gear rack 22 formed on one side of the projecting part of the valve stem 16; a pinion 23 which is formed integrally on a hollow shaft 24, the shaft being rotatably mounted in bearing bosses 25, 25' formed on the inner wall of the casing; a manually operable rotatable member, viz; a hand crank 26; and a releasable clutch between the shaft and hand wheel indicated generally at 27. The shaft 24 is retained against axial motion by being fixed to, viz., formed integrally with a circular disc or locking guide 28 which constitutes one element of the clutch and is rotatable together with a shaft outside of the wall of casing 1 and within an annular flange 29 formed integrally therewith. A rotatable annulus or drum 30 surrounds the locking guide 28 with some clearance and is fixed to a shaft 31 having a non-circular portion to which the hand wheel 26 is attached. The shaft 31 is journalled in a cap 32 which is threaded onto flange 29 to retain the parts in the positions shown in Figure 1. The radial inner face of the drum 30 has one or more inwardly directed cam projections 32 which slope gradually from the circular part of the face and cooperate with the curved nose 33 of an axially reciprocable locking pin 34; the latter is guided in a radial well 35 in the locking guide 28 and is rotatable therewith, being urged radially outwardly by a light coiled compression spring 36. When the pin 34 is held radially outwardly, rotation of the drum 30 by the hand wheel 26 causes the projection 32 to engage the nose 33, thereby imparting rotation to the locking guide 28, shaft 24 and pinion 23 to impart axial movement to the valve stem 16 against the action of spring 19; this lifts the auxiliary valve 15 and the upper face thereof engages the cap 17. Continued rotation of the hand wheel moves valve 15 farther away from the closed (downward) position thereof causes the main valve 6 to be lifted. It is evident that the hand wheel 26 and drum 30 may be held stationary in any intermediate or final position for these valves and that no movement of the valve stem 16 occurs so long as the hand wheel is kept stationary.

The locking pin 34 is normally held in its operative outer position by a blocking member 37 which is fixed to the end of a release rod 38 which extends through the hollow bore of the shaft 24 and forms the part of the automatic shut-off mechanism to be described. The block has a pair of anti-friction rollers 39, 39'; the former rolls on a flat face 40 forming a wall of a cavity on the guide, and the latter cooperates with the inner end of a locking pin. It is evident that when the rod 38 and member 37 are at the right as shown in Figures 1 and 2, the latter prevents any inward movement of the pin 34 but that retraction of the locking member to the left permits the pin to move inwardly when the nose 33 slides with respect to the inclined surface of the cam projection 32, thereby permitting rotation of the shaft 24 independently of the hand wheel 26.

The casing 1 has an annular flange 41 formed on the side opposite to the clutch to which are attached a membrane or diaphragm 42 and a cap 41a, the latter defining a vacuum chamber 43 and the former constituting a movable wall thereof. The space between the membrane and the casing is open to the atmosphere through a vent port 44. The left end of the release rod 38 is connected to the membrane through a thrust bearing 45 so as to transmit axial movements of the diaphragm thereto while permitting rotation of the rod 38 with the blocking member 37 and guide 28. The diaphragm and rod are urged to the right by a compression spring 46 located in the vacuum chamber. The vacuum chamber is connected by a small conduit 47 and branch conduit 48 to a Venturi tube 49 which is located centrally within the spout 4 at some distance downstream from the valves 6 and 15. The Venturi tube is preferably of smaller external diameter than the spout 4 so as to permit liquid to flow on the outside thereof. Small orifices 50 are formed at the throat and communicate with the conduit 48; this applies suction to the conduit 48 whenever liquid flows through the Venturi tube. This suction is normally dissipated by a vent comprising a vent conduit 51 which communicates with the conduit 47 and extends downwardly within the spout. The vent conduit has an opening 52 which communicates with the outside of the spout through a registering hole therein. Conduit 51 has an annular projection 53 forming a downwardly facing valve seat for a valve ball 54 which is retained within the conduit by a removable pin 55 (see Figure 6).

The valve lifting and the unlocking mechanism and the automatic shut-off mechanism are thus arranged and fitted to the nozzle in such a way that a compact construction is obtained.

The operation of the device is as follows:

The nozzle 4 is inserted into the opening of the tank to be filled and held, for example, by a spring-loaded stop (not shown) at such a height that the opening 52 corresponds with the level to which the tank is to be filled. The liquid is under pressure above the cylinder 9 and within the space 13 around the closed valves 6 and 15 of the nozzle. The blocking member 37 is pressed to the right by the spring 46 owing to the membrane 42 being under atmospheric pressure on both sides. The lock pin 34 remains pressed outward therefore and when the crank 26 is turned and projection 32 engages the nose 33 of the pin; thereby the locking guide 28, shaft 24 and pinion 23 are rotated and the rack 22 and valve 15 are lifted. Liquid flows through the opening 12 and the opening 14 of this valve, thus relieving the main valve 6, so that when the crank 26 is turned further the main valve 6 can easily be carried up by the engagement of relief valve 15 with the cap 17 and entirely opened against the action of the spring 7. This covers the port 12. Liquid flows through the Venturi tube 49 both when liquid is admitted at the beginning by the valve 15 and when liquid flows through the device via the opened valve 6, thereby causing suction to take place in the conduits 47 and 51 and air from the tank to be filled to be sucked in through the opening 52. The pressure in the vacuum chamber 43 therefore remains at almost atmospheric level and at the same time the crank 26 is held fast by hand, whereby the cam 32 remains in contact with the nose of the lock pin 34.

When the liquid level in the tank reaches the opening 52 liquid instead of air is sucked into the lower end of the vent conduit 51. In contrast with the air, this liquid entrains the valve ball 54 up to its seat 53, closing off the vent conduit. A partial vacuum is then created in the conduit 47 and the vacuum chamber 43 communicating therewith, which soon reaches such a value that the force exercised by the spring 46 is overcome and the release rod 38 with the blocking member 37 is pulled to the left, the rollers 39 and 39' reducing the friction to a great extent.

The pressure between the cam 32 and the nose of the lock pin 34 then causes the latter to be radially pressed inwards in opposition to the action of the spring 36, so that the rack 22 with valve stem 16 and the valves 6 and 15 can move downwards under the influence of the springs 7 and 19 notwithstanding that the crank 26 is held fast. The valves close therefore and the fact that the space within the cylinders 8 and 9 communicates only by a narrow passage 11 with the liquid chamber of the device (until almost the end of the stroke, when the port 12 is uncovered) ensures that the closure is only gradually effected, thus preventing a violent shock of the nozzle and the tank wall supporting it.

As a result of the foregoing, the tank has now been filled at great liquid delivery speed to a level which is close to that theoretically determined by the position of the opening 52. In practice, however, this theoretically determined level is not attained as the powerful jet creates so much agitation and foam formation in the liquid of the tank that the valve already shuts when the tank is supplied with a quantity of liquid which, when at rest, does not reach the desired level. In order to attain this desired level with a negligible deviation it is necessary to complete filling up the tank comparatively slowly. If for this purpose the main valve is lifted only slightly, the action of the Venturi tube becomes uncertain but not, however, if the relief valve only is used, as this delivers a relatively thin but compact jet, which is directed along the center line of the Venturi tube. For the final filling up operation, the device can, if desired, be raised and be brought into a slightly higher position with respect to the tank, for instance, by means of a second spring-loaded stop (not shown). After the flow of liquid has ceased in consequence of the above-described closing of both valves, and the vacuum has consequently been broken, the ball 54 falls from its seat 53, whilst the spring 46 pushes the blocking member 37 under the inner end of the lock pin 34; this forces the pin radially outward and restores the clutch to operative condition. Now the auxiliary or relief valve 15 only is lifted by operating the crank 26 through a limited distance, and liquid flows via the opening 12 and the valve port 14 into the delivery spout and strikes the Venturi tube 49. The further action, occurring when the tank is filled more accurately to the level of the opening 52, is as previously described. When the device is used in this manner a rapid filling of the tank is therefore combined with an accurate control of the desired level.

When filling smaller tanks it may be desirable to use the auxiliary relief valve only.

I claim as my invention:

1. In an automatic shut-off liquid dispensing nozzle having inlet means for liquid and a spout adapted to be inserted into a container to be filled, the combination of a pair of passageways separately connecting the inlet means and spout; individual valve control means for said passageways, one of said passageways and the valve therefor jointly having limited dimensions to supply liquid to said spout only as a stream with a cross section smaller than that of said spout; means for selectively opening said valve control means; and automatic shut-off means for both of said valve control means comprising a vacuum-actuated valve shut-off mechanism adapted to shut both said valves upon application of a vacuum thereto, vacuum-creating means connected to said shut-off mechanism disposed to create a vacuum when liquid flows through either of said passageways and vent means for relieving said vacuum and adapted to be rendered inoperative upon the filling up of said container.

2. In an automatic shut-off liquid dispensing nozzle having a spout adapted to be inserted into a container to be filled, a manually operable valve, a vacuum-actuated shut-off mechanism for said valve, and means connected to said mechanism for generating a vacuum upon flow of liquid through the nozzle, the improvement that includes a vent for relieving the said vacuum and thereby preventing operation of said shut-off mechanism, said vent comprising a conduit on the spout having an opening at the height of the liquid level to be attained when the automatic shut-off means operates, said conduit having a valve seat between the opening and the shut-off mechanism and containing a fluid-responsive valve member between the seat and the opening adapted to be pressed onto the seat only by liquid entering the conduit but not by air entering the conduit.

3. The combination according to claim 2 wherein the valve member is a ball.

4. In an automatic shut-off liquid dispensing nozzle having an inlet for a liquid and a spout adapted to be inserted into a container to be filled, the combination of a pair of passageways separately connecting the inlet to a point upstream from the end of the spout for passing the same liquid at different rates of flow; individual valve control means for said passageways, one of said passageways and the valve therefor jointly having limited dimensions to supply liquid to said spout only as a small stream with a cross section smaller than that of said spout; means for selectively opening said valve control means for dispensing liquid at a selected rate of flow; and automatic shut-off means for both of said control means comprising a vacuum-actuated shut-off mechanism, a Venturi tube in said spout downstream from said point and located to receive liquid passed through either passageway and having vacuum-creating duct means connected to said mechanism, said Venturi tube having a cross section smaller than said spout and being spaced from said spout to provide a passageway for liquid between the tube and spout, whereby said Venturi tube receives liquid in sufficient quantity to create a vacuum at each of said different rates of flow, and vent means for said duct means adapted normally to relieve the vacuum and to be rendered inoperative upon the filling up of said container.

5. In an automatic shut-off liquid dispensing nozzle having an inlet for liquid and a spout adapted to be inserted into a container to be filled, the combination of a main valve between said inlet and spout arranged to pass a relatively large current of liquid when open and to interrupt the flow of liquid when closed; a passageway interconnecting the inlet and spout and bypassing said main valve; a smaller valve for said passageway for relieving the pressure from said main valve and passing a relatively smaller current of liquid when the smaller valve is opened; manually controlled means for selectively opening only the smaller valve or at least the main valve; vacuum-actuated mechanism for closing the main and smaller valves; and vacuum-creating means for applying a vacuum to operate said mechanism both by the flow of liquid admitted by the main valve when the liquid in the container has risen to a predetermined level.

6. In an automatic shut-off liquid dispensing nozzle having an inlet for liquid and a spout adapted to be inserted into a container to be filled, the combination of a first passageway between said inlet and spout arranged to discharge liquid concentrically with the spout; a main valve for said passageway arranged to pass a relatively large current of liquid sufficient to fill said spout substantially when open and to interrupt the flow of liquid when closed; a second passageway within said main valve disposed substantially concentrically therewith and arranged to pass a relatively smaller current of liquid concentrically with said large current occupying only a portion of the cross sectional area of said spout; a smaller valve for said second passageway; manually controlled means for selectively opening only the smaller valve or at least the main valve; vacuum-actuated mechanism for closing the main and the smaller valve; and vacuum-creating means for applying a vacuum to operate said mechanism including a Venturi tube disposed in said spout downstream from said valves and substantially in extension of the center line of the main valve, said Venturi tube having a cross section smaller than said spout and being spaced from said spout to provide a flow passageway for liquid between the tube and the spout whereby said Venturi tube receives both liquid admitted to said spout by said main valve and liquid admitted by said smaller valve in sufficient quantity to fill said tube and to create a vacuum both with said large current and with said smaller current of liquid.

7. In an automatic shut-off liquid dispensing nozzle having an inlet for liquid and a spout adapted to be inserted into a container to be filled, the combination of a main valve between said inlet and spout arranged to pass a relatively large current of liquid when open and to interrupt the flow of liquid when closed; a passageway interconnecting the inlet and spout and bypassing said main valve; an auxiliary valve for said passageway for relieving the pressure from said main valve and passing a relatively smaller current of liquid when the auxiliary valve is opened; resilient means urging the main valve to closed position; a lost-motion connection between the main and auxiliary valves for opening the main valve by continued movement of the auxiliary valve away from the closed position thereof beyond at least initial opening thereof; manually operable means for moving said auxiliary valve away from closed position, whereby the main valve can be opened by continuing the movement of said auxiliary valve away from closed position beyond said initial opening; and means operatively associated with said auxiliary valve and operative when either the main or auxiliary valve is open for returning the auxiliary valve to closed position in response to a rise in the level of liquid in said container above a predetermined level, whereby the main valve, if open, is released to return to closed position under influence of said resilient means.

8. The combination according to claim 7 wherein the manually operable means comprises a manually operable member movable for a distance in accordance with the distance to which it is desired to move the auxiliary valve, and a releasable connection between said member and the auxiliary valve for transmitting motion to the latter, said releasable connection being releasable in any position of the auxiliary valve away from the closed position thereof.

9. An automatic shut-off liquid dispensing nozzle having an inlet for liquid and a spout adapted to be inserted into a container to be filled, the combination of a main valve between said inlet and spout arranged to pass a relatively large current of liquid when open and to interrupt the flow of liquid when closed; a passageway interconnecting the inlet and spout and bypassing said main valve; an auxiliary valve for said passageway for relieving the pressure from said main valve and passing a relatively smaller current of liquid when the auxiliary valve is opened, said auxiliary valve having an axially reciprocable stem; resilient means urging the main valve to closed position; a lost-motion connection between the main and auxiliary valves for opening the main valve by continued movement of the auxiliary valve away from the closed position thereof beyond at least initial opening thereof; means for moving said auxiliary valve away from closed position, including a gear rack on said stem, a pinion meshing with said rack, a manually operable rotatable member, a clutch for transmitting motion from said manually operable member to said pinion, and a clutch release element, whereby the main valve can be opened by operation of said rotatable member to move said auxiliary valve away from the closed position beyond said initial opening; and means operatively associated with said auxiliary valve and operative at any position of the auxiliary valve for actuating said clutch release element to release the clutch and for returning the auxiliary valve to closed position in response to a rise in the level of liquid in said container above a predetermined level, whereby the main valve, if open, is released to return to closed position under influence of said resilient means.

10. In an automatic shut-off liquid dispensing nozzle having an inlet for liquid and a spout adapted to be inserted into a container to be filled, the combination of a valve having a reciprocable part for controlling the flow of liquid from said inlet to the spout; a hollow rotatable shaft operatively connected to said reciprocable part to actuate said valve between open and closed positions; a manually operable rotatable member at one end of the shaft; releasable clutch means at the said end of the shaft for transmitting motion from said manually operable member to said shaft; resilient means urging said valve to closed position; a vacuum chamber having a movable, vacuum-responsive element at the other end of said shaft; a clutch release element operatively connected to derive motion from said element and extending through said hollow shaft for releasing the clutch upon rise of vacuum in said chamber; vacuum-creating means connected to said chamber disposed to create a vacuum when liquid flows through the spout; and vent means for relieving said vacuum and adapted to be rendered inoperative upon the filling of the container to a predetermined level.

11. The combination according to claim 10 wherein the clutch comprises a reciprocable locking member for connecting the manually operable member rotatively to the hollow shaft in a first position of the locking member and unlocking the shaft in a second position, and a blocking member movable with said clutch release element and provided with rollers for blocking the movement of the blocking member from first to second position in one position of the blocking member and permitting such movement in another position thereof.

12. The combination according to claim 10 wherein the clutch comprises an annulus rotatable with the manually operable member having one or more cam projections extending radially inwardly; a locking guide within the annulus rotatable with said hollow shaft; a radially reciprocable locking member guided in and rotatable with said guide having the outer end thereof engageable with said cam projections for transmitting rotation between the annulus and the guide when in the first, outer position thereof and urged radially inwardly by the cam projection to an unlocked, second position wherein the guide is free to rotate relatively to the annulus; and a blocking member within the guide and reciprocable axially with respect to the hollow shaft and connected for movement with the clutch release element for blocking the locking member in the first position thereof in one position of the blocking member and freeing the locking member for movement to the second position thereof in another position of the blocking member.

13. In an automatic shut-off liquid dispensing nozzle having an inlet for liquid and a spout adapted to be inserted into a container to be filled, the combination of a reciprocable main valve between said inlet and spout and coaxial with the spout arranged to pass a relatively large current of liquid when open and to interrupt the flow of liquid when closed; guide means for said main valve; resilient means urging said main valve to closed position; a central opening in said main valve forming an auxiliary passageway; an axially reciprocable auxiliary valve upstream from said central opening having a valve stem extending upstream therefrom; normally separated abutment means between said main and auxiliary valves located for engagement after initial opening of the auxiliary valve for opening the main valve; a gear rack on said valve stem; a transverse shaft with a pinion fixed thereto and meshing with the rack; a manually rotatable member at one end of said shaft and separate therefrom; releasable clutch means between said shaft and manually rotatable member for transmitting motion, whereby said auxiliary valve may be lifted to any desired extent; a clutch release member for said clutch; resilient means urging said clutch release member to lock the clutch in torque-transmitting condition; a vacuum chamber at the other end of said shaft having a movable wall connected to said clutch release member for releasing the clutch when a vacuum is applied; an annular Venturi tube in said spout substantially coaxial with the spout and spaced from the walls thereof for receiving liquid flow both when only the auxiliary valve is opened and when the main valve is opened; conduit means for transmitting vacuum generated in said Venturi tube to the vacuum chamber; and vent means connected to said conduit means and fixed to the spout having an opening for relieving the vacuum except when the level of liquid in said container rises to the level of said opening.

ALBERT JACOB HUISMAN.

References Cited in the file of this patent

UNITED STATES PATENTS

| Number | Name | Date |
| --- | --- | --- |
| 1,821,206 | Caswell | Sept. 1, 1931 |
| 2,420,341 | Samiran et al. | May 13, 1947 |
| 2,527,760 | Piquerez | Oct. 31, 1950 |
| 2,528,747 | Gravelle | Nov. 7, 1950 |